Patented Oct. 13, 1925.

1,557,235

UNITED STATES PATENT OFFICE.

HEINRICH BECHHOLD, OF FRANKFORT-ON-THE-MAIN, GERMANY.

FILTER.

No Drawing. Application filed July 1, 1924. Serial No. 723,592.

*To all whom it may concern:*

Be it known that I, HEINRICH BECHHOLD, a citizen of Germany, residing at Frankfort-on-the-Main, Germany, have invented certain new and useful Improvements Relating to Filters, of which the following is a specification.

This invention relates to filters of diatomaceous earth, cellulose, clay, carbon, and other suitable materials for filtering water fruit juices, serum, toxin and similar liquids, as well as to filtering systems having beds or layers of sand, gravel, coke or the like. Although the filters at present in use are well adapted to retain for a certain time micro-organisms, these grow very soon through the pores of the filter with the result that in one or in several days the filtered liquid becomes infected.

There are known filters, which are impregnated with platinum or with oxide or iron. Filters, which are impregnated with those materials are no better able to prevent bacteria from growing through, than such ones, which are not impregnated at all.

There has been suggested to destroy micro-organisms in liquids, for instance, in water, milk, etc., by passing the liquid through a bed or a layer of grains of sand or suitable material, which has been coated with silver or gold or copper in the form of a colloidal film or the silver mirror. Experiments have shown, that such beds, whose grains are coated with copper or silver, are able to retard growing through of germs but for a short time. Grains coated with gold proved to be still less fit.

Experiments have shown, that the growing of bacteria through filters can be prevented by impregnating the filter with a plurality of insoluble or not easily soluble inorganic substances of which one of the said substances has to be an insoluble or not easily soluble compound of a metal and the other a metal.

There are to be considered as principal ingredients insoluble or not easily soluble compounds of metals, whose solution tension is lower than that of hydrogen but higher than that of platinum. It proved to be advantageous to apply the compounds of metals and the metals conjointly so, that one substance for instance the compound of metal is in prevailing quantity, while the other substance, in my examples the metal, is applied in relatively small quantity. The substance applied in small quantity acts as an activator favouring the germicide effect of the principal substance.

The process can be done in that way, that the filter is impregnated with an insoluble or not easily soluble compound of a metal of lower solution tension than hydrogen and of higher solution tension than platinum, while moreover there is incorporated in the filtering mass a relatively small quantity of an activating metal. There are to be considered as principal substances of first importance insoluble or not easily soluble compounds of copper, silver or mercury as oxide of copper, copper-ferrocyanate copper-carbonate, silver-chloride, silver-oxide, silver-sulphocyanate, mercury-oxide, mercurous chloride, etc. There are to be considered useful but of secondary importance insoluble or not easily soluble compounds of bismuth, antimony and arsenic, such as the oxides of bismuth and antimony, the sulfide of arsenic, etc.

There are to be considered as activating metals those having a lower solution tension than hydrogen. To this group of metals belong of first importance copper, silver and mercury, gold and platinum, of secondary importance bismuth, antimony and arsenic.

But there can be also used as principal ingredients metals of lower solution tension than hydrogen and higher solution tension than platinum; in this case there should be added as activators of the principal ingredients compounds of lower solution tension than hydrogen.

It proved to be advantageous to use as principal ingredient the substance of higher solution tension and as an activator that of lower solution tension.

The principle of the invention is not changed if there are used alloys or amalgams instead of the considered metals. There is to be understood under "metals" always also the corresponding alloys or amalgams.

There were gained excellent results with filters which had been impregnated with silver-chloride as principal ingredient and with platinum as an activator, the silver-chloride constituting about 2% of the weight of the filter and the platinum only a small fraction of the silver-chloride.

The substance of the invention is not changed if there are added two or more activating ingredients instead of one. There could be applied, e. g., copper-oxide as principal ingredient and small quantities of silver and gold as activator. Instead of one principal ingredient for impregnation of the filter two or more may be used, e. g., instead of silver-chloride there could be applied two or more of such ingredients for instance silver-chloride and copper-oxide, so that those two substances together would be the principal ingredient and there could be added moreover a small quantity of an activator for instance gold or platinum.

Experiments however have proved that the combination of one principal ingredient for instance of copper-oxide alone or of silver-chloride alone, with a small quantity of one activator for instance of silver alone or of gold alone or of platinum alone gives such good results, that the incorporation of more than one principal ingredient or of more than one activator at least does not improve the effect. The following experiment serves by way of example to illustrate the effect of a filter treated according to this invention: A kieselguhr-filter was impregnated with silver-chloride, so that the silver-chloride was two per cent of the weight of the kieselguhr. Moreover, there was incorporated in the filter a small quantity of gold, so that the weight of the gold was nearly one per cent of the weight of the silver-chloride. Through such a filter was passed water infected by bacterium coli. Though this infected water was passed through the filter for many months, the filtrate proved to be free of bacteria. The same good results were obtained with water infected by *B. typhosus* and *B. paratyphasus*. Even saprophyte water bacteria which, as is well known, very rapidly grow through filters, were prevented for months from growing through filters impregnated in accordance with this invention.

The described method of impregnation is most useful for filters of every kind e. g. of tubes, plates and so on for filtering materials of different sorts as e. g. kieselguhr, carbon and so on. For gaining good results it is essential that the impregnating substance is distributed as uniformly as possible throughout the total mass of the filter.

Claims:

1. A filter impregnated with a plurality of insoluble or not easily soluble inorganic substances, one of the said substances being a metal of lower solution tension than hydrogen and of higher solution tension than platinum, the other one being a compound of a metal of lower solution tension than hydrogen.

2. A filter impregnated with a plurality of insoluble or not easily soluble inorganic substances, one of the said substances being a metal of lower solution tension than hydrogen and of higher solution tension than platinum, the other one being a compound of a metal of lower solution tension than hydrogen, the latter being present in a relatively small quantity and acting as an activator.

3. A filter impregnated with at least one insoluble or difficultly soluble compound of a metal or lower solution tension than hydrogen and of higher solution tension than platinum and with at least one insoluble or difficultly soluble activating substance.

4. A filter impregnated with an insoluble or difficultly soluble compound of a metal of lower solution tension than hydrogen and higher solution tension than platinum and with a relatively small quantity of an insoluble or difficultly soluble activating substance.

5. A filter impregnated with an insoluble or difficultly soluble compound of a metal of lower solution tension than hydrogen and of higher solution tension than platinum and with an insoluble or difficultly soluble compound of a metal of lower solution tension than hydrogen acting as an activator.

6. A filter impregnated with an insoluble or difficultly soluble compound of a metal of lower solution tension than hydrogen and of higher solution tension than platinum and with an activating metal having a lower solution tension than hydrogen.

7. A filter impregnated with an insoluble or difficultly soluble compound of a metal of lower solution tension than hydrogen and of higher solution tension than platinum and with activating substances, of which one is an insoluble or difficultly soluble compound of a metal of lower solution tension than hydrogen and another is a metal of lower solution tension than hydrogen.

8. A filter impregnated with at least two insoluble or difficultly soluble compounds of metals of lower solution tension than hydrogen and of higher solution tension than platinum, one of said compounds being in predominant quantity.

9. A filter impregnated with at least one insoluble or difficultly soluble compound of a metal of lower solution tension than hydrogen and higher solution tension than platinum and with an insoluble or difficultly soluble compound of a metal of lower solution tension than silver.

10. A filter impregnated with at least one insoluble or difficultly soluble compound of a metal of lower solution tension than hydrogen and of higher solution tension than platinum and with an activating metal of lower solution tension than silver.

In testimony whereof I affix my signature.

HEINRICH BECHHOLD.